United States Patent [19]
Suzuki et al.

[11] Patent Number: 5,670,866
[45] Date of Patent: Sep. 23, 1997

[54] CHOPPER-TYPE REGULATOR CIRCUIT AND CHOPPER-TYPE REGULATOR IC

[75] Inventors: Tomohiro Suzuki, Kitakatsuragi-gun; Kenji Hachimura, Nara, both of Japan

[73] Assignee: Sharp Kabushiki Kaisha, Osaka, Japan

[21] Appl. No.: 563,766

[22] Filed: Nov. 28, 1995

[30] Foreign Application Priority Data

Nov. 28, 1994 [JP] Japan .................... 6-293009
Sep. 18, 1995 [JP] Japan .................... 7-237985

[51] Int. Cl.$^6$ ............................................ G05F 1/56
[52] U.S. Cl. .................... 323/289; 323/284; 323/283
[58] Field of Search ............................ 323/282, 283, 323/284, 289

[56] References Cited

U.S. PATENT DOCUMENTS 4,792,747  12/1988  Schroeder .................... 323/303

FOREIGN PATENT DOCUMENTS 5292735  11/1993  Japan .

*Primary Examiner*—Peter S. Wong
*Assistant Examiner*—Shawn Riley

[57] ABSTRACT

A chopper-type regulator circuit includes an output transistor composed of a PNP-type transistor, and a control section for controlling switching of the output transistor based upon a voltage difference between a reference voltage and an output voltage. The control section is provided with a base current output terminal for supplying a base current of the output transistor to a load connected to the chopper-type regulator circuit. This makes it possible to reduce a loss of the circuit, thereby improving efficiency of the circuit.

10 Claims, 12 Drawing Sheets

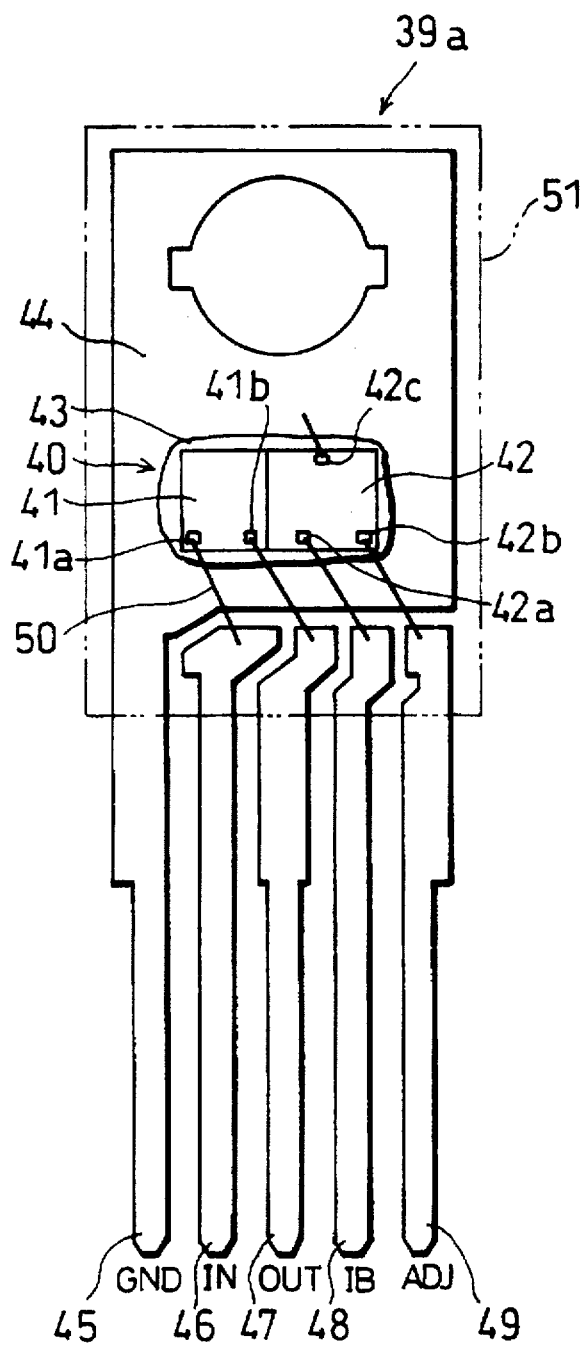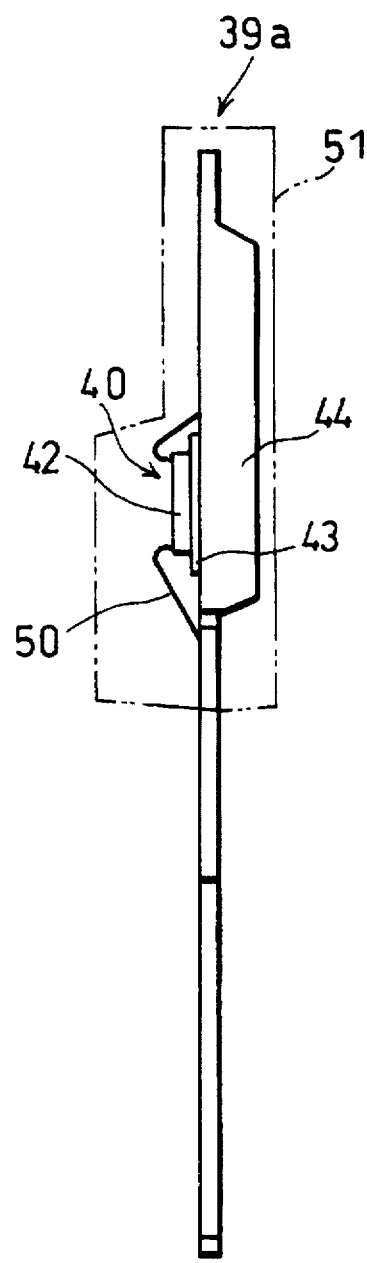

FIG. 9(a)
PRIOR ART
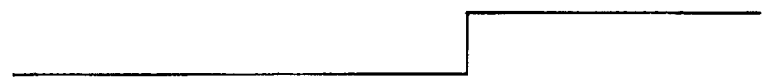
FIG. 9(b)
PRIOR ART
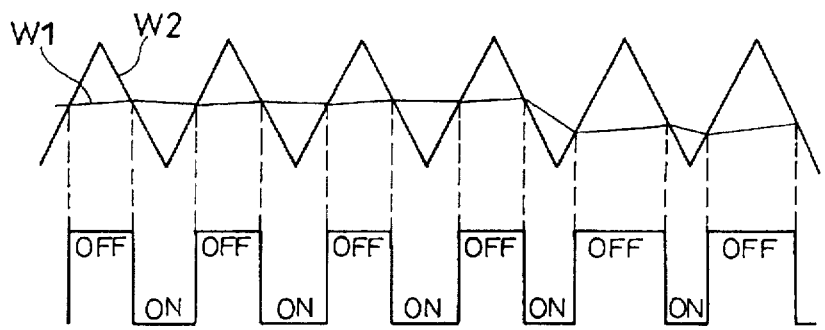
FIG. 9(c)
PRIOR ART
FIG. 9(d)
PRIOR ART
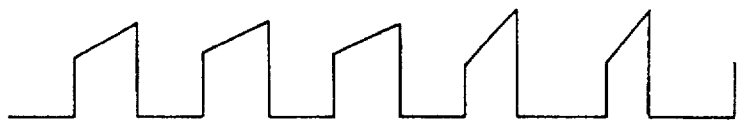
FIG. 9(e)
PRIOR ART
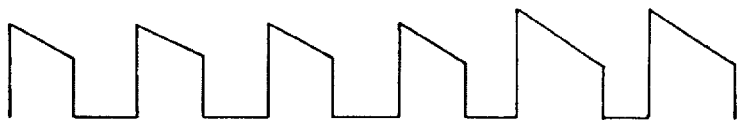
FIG. 9(f)
PRIOR ART
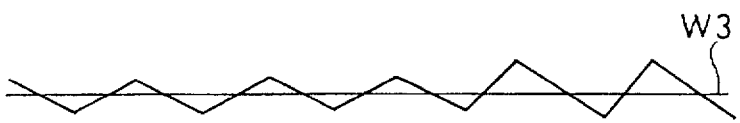

CHOPPER-TYPE REGULATOR CIRCUIT AND CHOPPER-TYPE REGULATOR IC

FIELD OF THE INVENTION

The present invention relates to a chopper-type regulator circuit and a chopper-type regulator IC that stabilize an output voltage by controlling switching of an output transistor which is a PNP-type transistor based upon a voltage difference between a reference voltage and the output voltage.

BACKGROUND OF THE INVENTION

In order to obtain a stabilized d.c. voltage which is required for electronic equipment, etc., a regulator circuit is generally used. There is a step-down-type regulator circuit which obtains an output voltage lower than an input voltage as one kind of such a regulator circuit. The step-down-type regulator has two types.

The first one is a regulator circuit which is called a dropper system, and the dropper system has the advantages of low noises and of simple design. This is used in a place where a difference (voltage difference) between an input voltage and an output voltage is small.

The second one is a regulator circuit that is called a chopper system, and the chopper system has the advantages of good efficiency in the case where the difference between the input voltage and the output voltage is large.

The following will concretely discuss the regulator circuit having the chopper system.

FIG. 8 is a block diagram which shows an electrical configuration of the chopper-type regulator circuit (hereinafter, referred to as the regulator circuit) which controls a pulse width of a voltage mode. A regulator circuit 13 is composed of a reference voltage circuit 1, an error amplifier 2, an oscillator 3, a PWM (Pulse Width Modulation) comparator 4, a drive transistor 5 which is a PNP-type transistor and an output transistor 6 which is an NPN-type transistor. The regulator circuit 13 stabilizes the output voltage by controlling the pulse width of the voltage mode.

Here, a catch diode 7, a coil 8, a voltage dividing circuit composed of two resistors 9 and 10, and an output capacitor 11 as indispensable constituents are mounted to the outside of the regulator circuit 13, and but for them, the output voltage cannot be obtained (in the drawing, 12 represents a load).

Next, an operation of the regulator circuit 13 will be explained. FIGS. 9(a) through 9(f) are drawings which shows waveforms of main signals.

First, when an input voltage $V_{IN}$ shown in FIG. 9(a) is applied to an input terminal IN, the regulator circuit 13 is actuated. Then, an output voltage $V_O$ is divided by the voltage dividing circuit composed of the resistors 9 and 10 connected to a load 12, and the divided voltage is fed back into a feedback terminal ADJ. Since the feedback terminal ADJ is connected to a reverse input of the error amplifier 2, the error amplifier 2 outputs an error signal (differential voltage) obtained by amplifying a voltage difference between the divided voltage and a reference voltage outputted from the reference voltage circuit 1. The error signal is represented by a voltage waveform W1 of FIG. 9(b).

Meanwhile, in the PWM comparator 4, a voltage waveform W2 outputted from the oscillator 3 is compared with the voltage waveform W1 of the error signal. Here, when the voltage waveform W2 becomes higher than the voltage waveform W1, the output of the PWM comparator 4 becomes H level. On the contrary, when the voltage waveform W2 becomes lower than the voltage waveform W1, the output of the PWM comparator 4 becomes L level. For this reason, a waveform signal shown in FIG. 9(c) is outputted from the PWM comparator 4. This signal controls switching of the output transistor 6 through the drive transistor 5. In other words, when the PWM comparator 4 becomes H level, the output transistor 6 is turned off, and when L level, the output transistor 6 is turned on.

In the above switching operation, when the output transistor 6 is in ON state, a current is supplied to the load 12 through the input terminal IN, the output transistor 6 and the coil 8. Moreover, when the output transistor 6 is in OFF state, the current, which is generated by energy stored in the coil 8 while the output transistor 6 is in ON state, is supplied to the load 12 through the catch diode 7.

A current waveform which flows in the output transistor 6 is shown in FIG. 9(d), a current waveform which flows in the catch diode 7 is shown in FIG. 9(e) and a current waveform which flows in the coil 8 is shown in FIG. 9(f). At this time, a current, which is an average value W3 of the current flowing in the coil 8, is supplied to the load 12 as the output current.

As mentioned above, the regulator circuit 13 for controlling the pulse width of the voltage mode controls the output voltage $V_O$ based upon the divided voltage of the voltage dividing circuit composed of the resistors 9 and 10 and the reference voltage of the reference voltage circuit 1.

When a relationship D=t1/(t1+t2) holds where a period while the output transistor 6 is in ON state is t1, a period while in OFF state is t2, and ON-time/period of the output transistor 6 is duty D, the duty D is represented as follows:

$$D=(V_o+V_F)/V_{IN}-V_{CE(sat)}+V_F.$$

Here, $V_O$: output voltage $V_F$: forward voltage of the catch diode 7

$V_{IN}$: input voltage $V_{CE(sat)}$: collector—emitter voltage of the output transistor 6

In other words, the periods t1 and t2 are determined by the output voltage $V_O$, the forward voltage $V_F$ of the catch diode 7, the input voltage $V_{IN}$, and the collector—emitter voltage $V_{CE(sat)}$ of the output transistor 6.

FIG. 10 is a block diagram which shows an electrical configuration of the chopper-type regulator circuit for controlling the pulse width of the current mode. In the blocks of FIG. 10, the numerals of FIG. 8 are given to the blocks which have an arrangement similar to that of the blocks shown in FIG. 8.

A regulator circuit 16 is composed of the reference voltage circuit 1, the error amplifier 2, the oscillator 3, the PWM comparator 4, a flip flop 14, a current detection amplifier 15, a current detecting resistor 17, the drive transistor 5 and the output transistor 6. In the regulator circuit 16, the pulse width of the current mode is controlled so that the output voltage is stabilized. Moreover, exterior components which has the arrangement same as of FIG. 8 are connected to the regulator circuit 16.

The following will explain an operation of the regulator circuit 16. FIGS. 11(a) through 11(h) are drawings which shows waveforms of main signals.

First, when the input voltage $V_{IN}$ shown in FIG. 11(a) is applied to the input terminal IN, the operation of the regulator circuit 16 is started up. The output voltage $V_O$ is divided by the voltage dividing circuit composed of the resistors 9 and 10 connected to the load 12, the divided voltage is fed back into the error amplifier 2 through a feedback terminal ADJ. Then, a voltage difference between the divided voltage and the reference voltage outputted from the reference voltage circuit 1 is amplified by the error amplifier 2 and an error signal (differential voltage) is outputted. This error signal is represented by a voltage waveform W4 of FIG. 11(b).

The current flowing in the output transistor 6 is detected by the current detecting resistor 17, and the current is converted into a voltage by the current detection amplifier 15, and the amplified voltage is outputted. Thereafter, a voltage waveform W5 showing the output of the current detection amplifier 15 and the voltage waveform W4 showing the error signal are compared by the PWM comparator 4.

When the voltage outputted from the current detection amplifier 15 becomes higher than the error voltage outputted from the error amplifier 2, the output of the PWM comparator 4 becomes H level (see FIG. 11(c)), and the flip flop 14 is reset. The drive transistor 5 and the output transistor 6 are turned off by the reset. These OFF states continue until a pulse (see FIG. 11(d)) for setting the flip flop 14 is sent out from the oscillator 3. When the pulse is sent out, the OFF states are converted into the ON states. FIG. 11(e) shows an output waveform of the flip flop 14.

In the above switching operation, when the output transistor 6 is in the ON state, the current is supplied to the load 12 through the input terminal IN, the output transistor 6 and the coil 8. Moreover, when the output transistor 6 is in the OFF state, the current, which is generated by energy stored in the coil 8 while the output transistor 6 is in the ON state, is supplied to the load 12 through the catch diode 7.

FIGS. 11(f), 11(g) and 11(h) are waveforms of main currents at the time of control by the above-mentioned current mode: FIG. 11(f) is a current waveform flowing in the output transistor 6; FIG. 11(g) is a current waveform flowing in the catch diode 7; and FIG. 11(h) is a current waveform flowing in the coil 8. At this time, a current which is an average value W6 of the current flowing in the coil 8 is supplied as the output current to the load 12.

As mentioned above, the regulator circuit 16 for controlling the pulse width of the current mode supervises the current flowing in the current detecting resistor 17 so as to control the output voltage $V_O$ based upon the divided voltage from the voltage dividing circuit composed of the resistors 9 and 10 and on the reference voltage from the reference voltage circuit 1.

As to characteristics of these two kinds of the regulator circuits, the regulator circuit 13 for controlling the pulse width of the voltage mode has a simpler arrangement, but since the pulse width is changed after the output voltage $V_O$ is changed, the regulator circuit 13 has a disadvantage that follow-up to the change in the input voltage $V_{IN}$ is delayed.

Meanwhile, since the pulse width is changed accordingly to the change in the input voltage $V_{IN}$ before the output voltage $V_O$ is changed, the regulator circuit 16 for controlling the pulse width of the current mode satisfactorily follows up the change in the input voltage $V_{IN}$ but its circuit configuration is complex.

Besides the above two regulator circuits, there exists a chopper-type regulator circuit for controlling pulse width of voltage mode which utilizes a PNP-type transistor as the output transistor instead of an NPN-type transistor.

FIG. 12 is a block diagram which shows an electrical configuration of the above-mentioned chopper-type regulator circuit. The same numerals as in FIG. 8 are given to the blocks having an arrangement similar to that of the blocks shown in FIG. 8 in the blocks of FIG. 12.

A regulator circuit 20 is composed of the reference voltage circuit 1, the error amplifier 2, the oscillator 3, the PWM comparator 4, an output transistor 18 which is a PNP-type transistor and a constant current circuit 21. Moreover, exterior components which have the same arrangement of FIG. 8 are connected to the regulator circuit 20.

The following will explain an operation of the regulator circuit 20.

First, when input voltage $V_{IN}$ is applied to an input terminal IN, the regulator circuit 20 is actuated. Then, output voltage $V_O$ is divided by a voltage dividing circuit composed of resistors 9 and 10 connected to a load 12, and the divided voltage is fed back into a feedback terminal ADJ. Since the feedback terminal ADJ is connected to a reverse input of the error amplifier 2, an error signal, which is generated by amplifying a voltage difference between the divided voltage and a reference voltage outputted from the reference voltage circuit 1, is outputted from the error amplifier 2.

Meanwhile, a voltage outputted from the oscillator 3 is compared with the error voltage outputted from the error amplifier 2 in the PWM comparator 4, and a signal of H level or of L level is outputted therefrom. The constant current circuit 21 draws a base current of the output transistor 18 so as to actuate the output transistor 18.

When the output transistor 18 is in ON state, the input terminal IN, the output transistor 18 and the coil 8 are successively energized, and a current is supplied to the load 12. When the output transistor 18 is in OFF state, the current, which is generated by energy stored in the coil 8 while the output transistor 18 is in ON state, is supplied to the load 12 through the catch diode 7.

As to the above-mentioned three chopper-type regulator circuit, in a chopper-type regulator circuit using an NPN-type transistor as an output transistor, an emitter-follower is adopted, so a voltage drop between a collector and an emitter in ON state becomes larger than that between a collector and an emitter of the PNP-type transistor. For this reason, a loss of the output transistor 6 is large, thereby arising raising a problem that efficiency of a regulator circuit is lowered.

Meanwhile, as shown in FIG. 12, with the arrangement using the PNP-type transistor as an output transistor, since a voltage drop between a collector and an emitter in ON state is small, a loss of the output transistor 18 is small. Therefore, efficiency of a regulator circuit becomes high.

However, a PNP-type transistor as an output transistor has disadvantages. The disadvantages will be explained below.

When the output transistor 18 is in ON state, the constant current circuit 21 draws a base current of the output transistor 18. The base current flows through the constant current circuit 21 into a ground terminal GND. The base current is normally constant irrespective of an output current, so it is dozens 10 mA. Moreover, since the regulator circuit 20 is generally used in a place where a voltage difference between an input voltage $V_{IN}$ and an output voltage $V_O$ is large, a high input voltage $V_{IN}$ is applied to the input terminal IN. For this reason, when the regulator circuit using a PNP-type transistor is compared the regulator circuits 13 and 16 using an NPN-type transistor, a drive loss represented by:

base current of output transistor 18×input voltage $V_{IN}$×duty becomes large.

In addition, since the base current is constant in spite of a magnitude of the load 12 when the output transistor 18 is in ON state, as shown by broken lines B of FIG. 7 which is an explanatory drawing of the present embodiment, the drive loss causes lowering of an efficiency especially at the time of a light load (low output current region).

SUMMARY OF THE INVENTION

It is a first object of the present invention to provide a chopper-type regulator circuit, having an arrangement that uses a PNP-type transistor as an output transistor, which is capable of improving its efficiency by supplying a base current of the output transistor, which flows into ground conventionally, directly to a load.

In order to achieve the above object, the chopper-type regulator circuit of the present invention includes an output transistor composed of a PNP-type transistor for switching an input current and a control section for controlling the switching of the output transistor based upon a voltage difference between a reference voltage and an output voltage. Moreover, the chopper-type regulator circuit is characterized in that the control section includes a base current output terminal for supplying a base current of the output transistor to a load connected to the chopper-type regulator circuit.

With the above arrangement, since the base current output terminal for outputting a base current flowing into the output transistor is provided to the control section, it is possible to take via the output terminal the base current outside. The base current output terminal is connected to a load connected to the chopper-type regulator circuit, thereby making it possible to directly supply the base current to the load. As a result, the losses of the driving section can be reduced, thereby improving efficiency.

In addition, it is a further object of the present invention to provide a chopper-type regulator IC which makes it possible to miniaturize the chopper-type regulator circuit.

In order to achieve the above object, the chopper-type regulator IC of the present invention is characterized by including (1) a semiconductor chip obtained by integrating the output transistor and the control section into one chip, (2) a metal frame, which is mounted with the semiconductor chip, having the base current output terminal and (3) a packing resin for sealing the semiconductor chip.

In addition, instead of the constitution (1), a semiconductor chip may be obtained by integrating the output transistor and the control section respectively into one chip.

With the above arrangement, since a chopper-type regulator IC can be obtained by providing a chopper-type regulator circuit as one package, it is possible to realize miniaturization of an IC.

In addition, in the case of the constitution (1), since a semiconductor chip is obtained by integrating an output transistor and a control section into one chip, it is possible to reduce a number of components and to lower its cost.

For a fuller understanding of the nature and advantages of the invention, reference should be made to the ensuing detailed description taken in conjunction with the accompanying drawings.

BRIEF DESCRIPTION OF THE DRAWINGS

FIG. 5(a) is a plan view which shows an arrangement of a chopper-type regulator IC of embodiment 3 of the present invention.

FIG. 5(b) is a side view of the above-mentioned chopper-type regulator IC.

FIGS. 9(a) through 9(f) are waveform diagrams which shows waveforms of main signals of the chopper-type regulator circuit shown in FIG. 8.

DESCRIPTION OF THE EMBODIMENTS

EMBODIMENT 1

Figure 2:
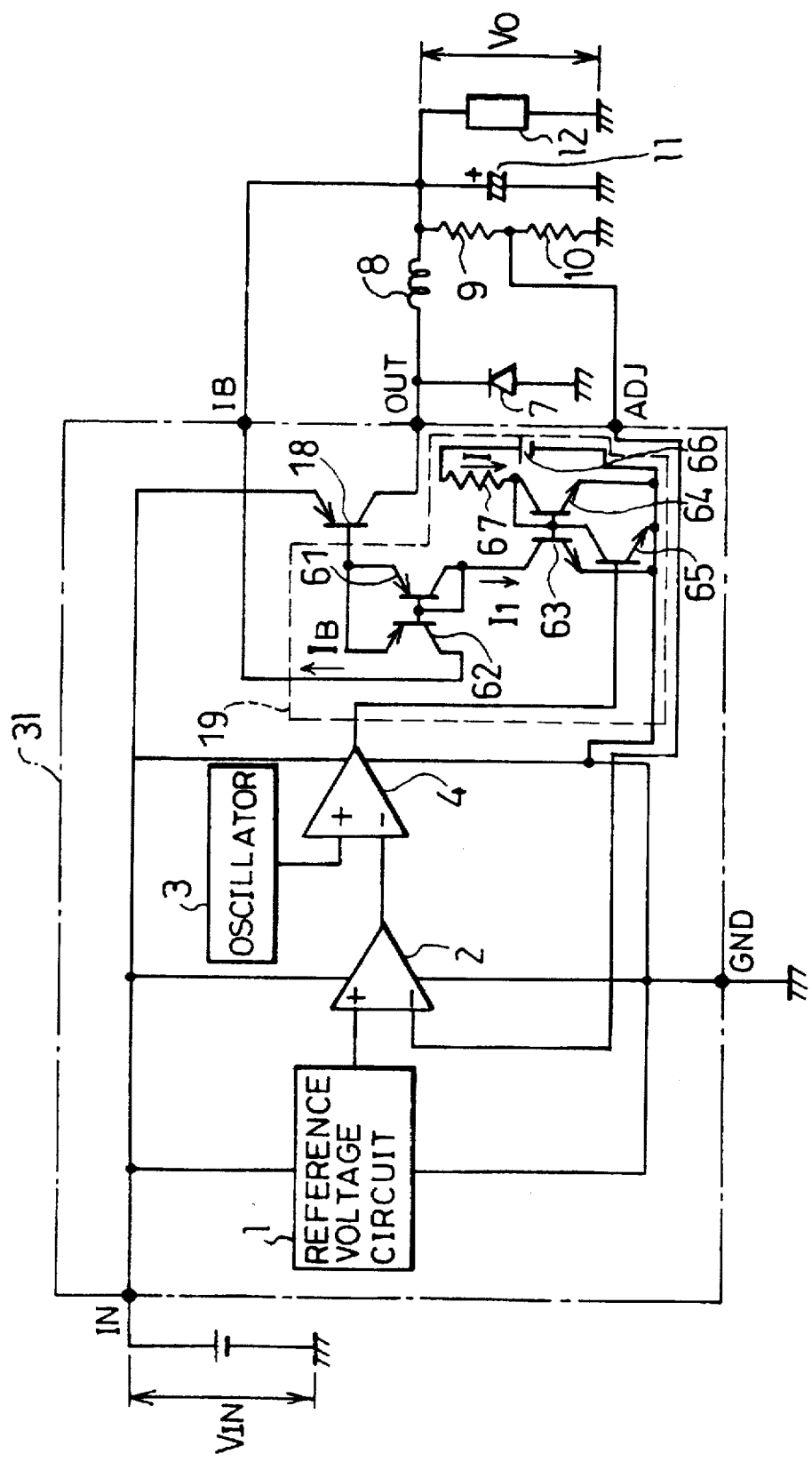
FIG. 2 is a circuit diagram which shows a concrete configuration of a constant current circuit shown in FIG. 1.
Figure 7:
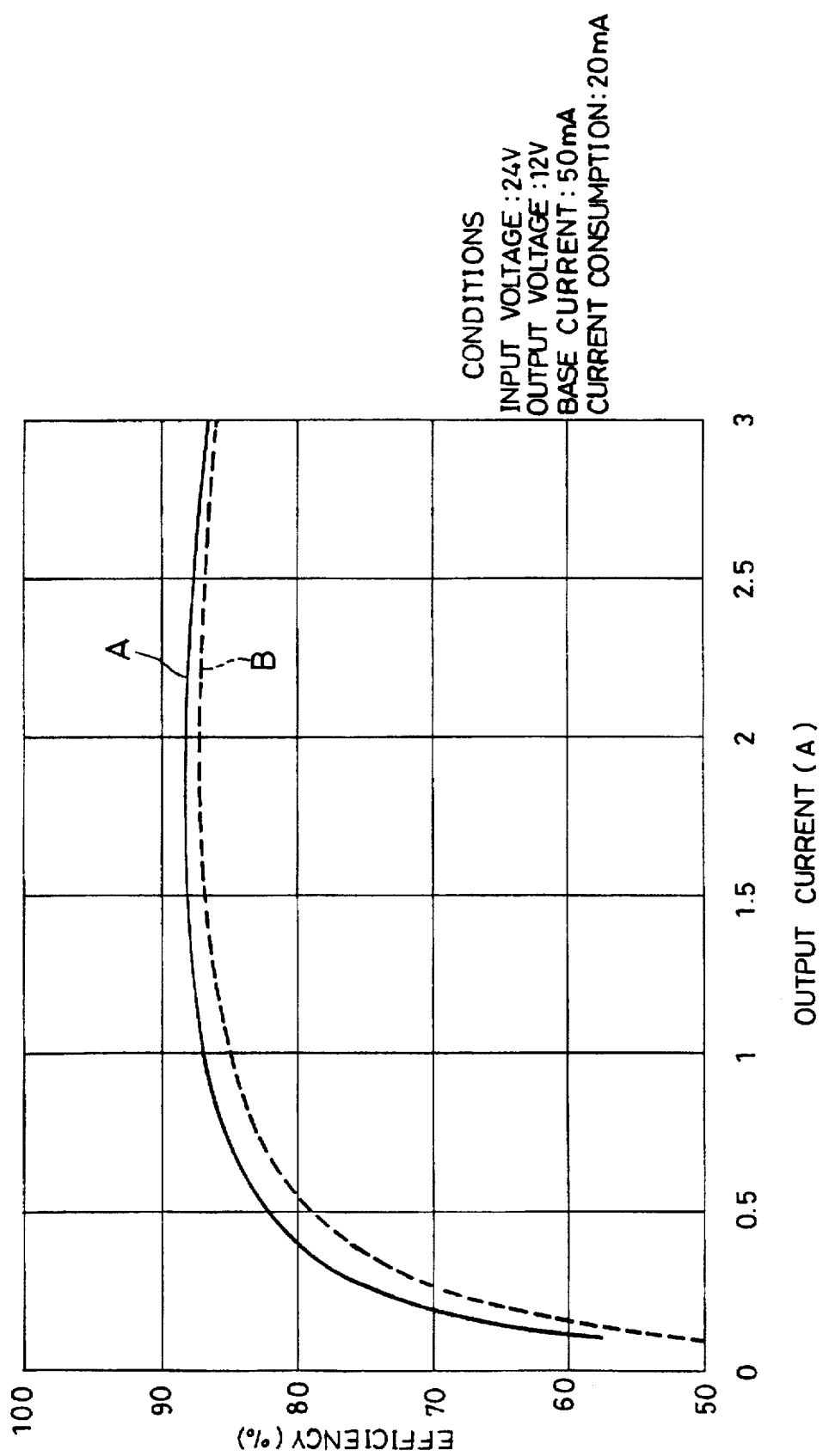
FIG. 7 is a graph which shows a relationship between an output current and efficiency in a chopper-type regulator circuit.
Figure 8:
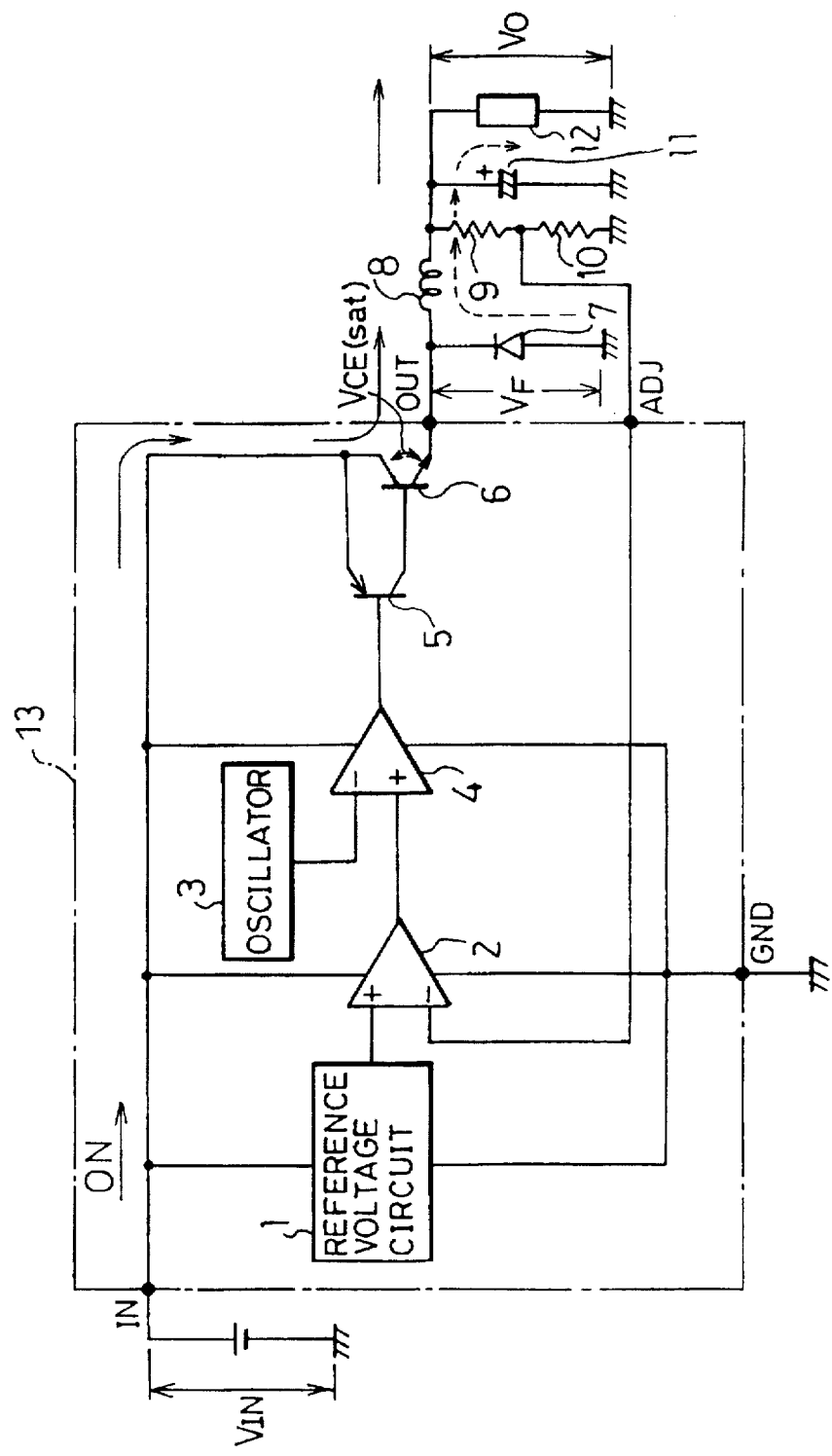
FIG. 8 is a block diagram which shows an electrical configuration of a conventional chopper-type regulator circuit for controlling a pulse width of a voltage mode.
Figure 10:
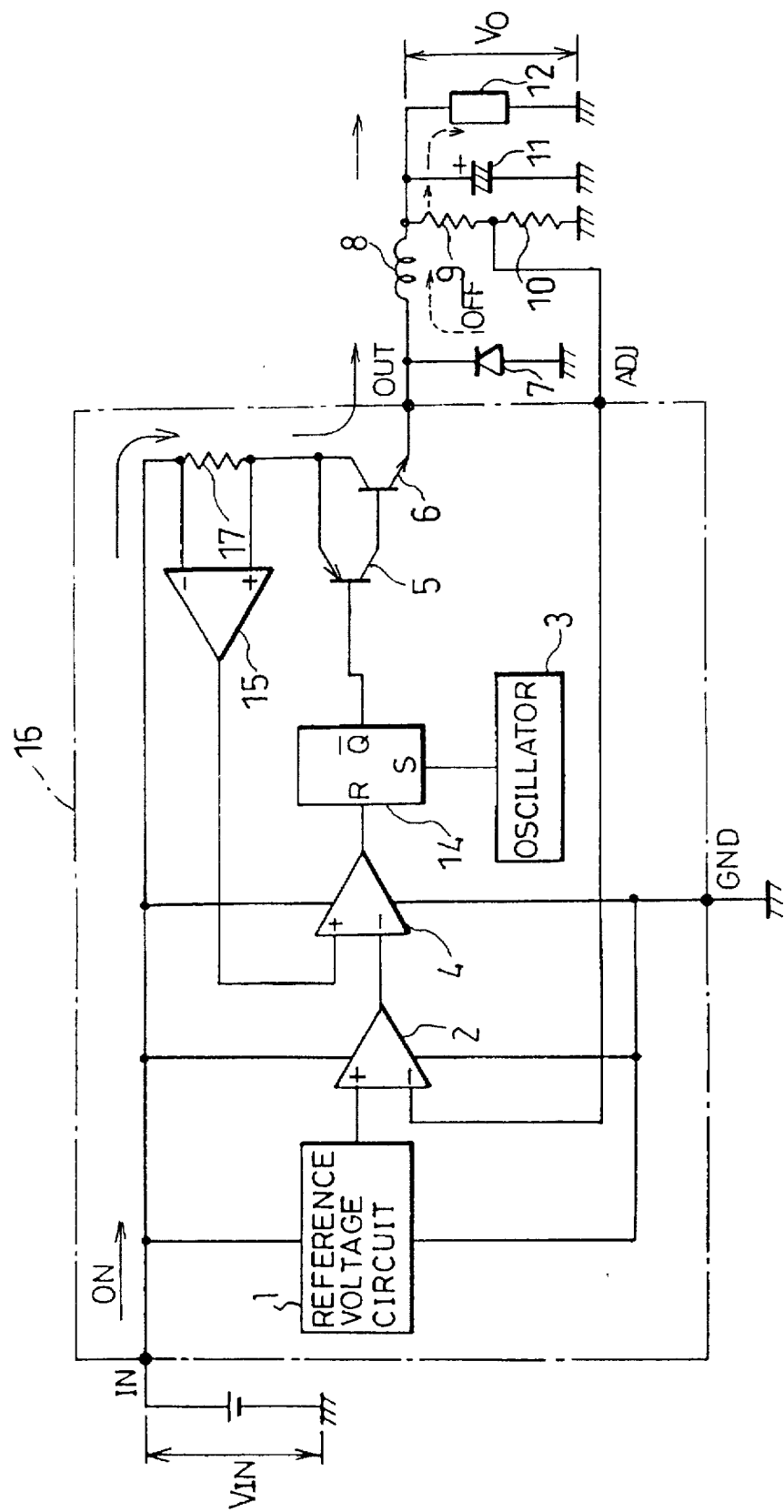
FIG. 10 is a block diagram which shows an electrical configuration of a conventional chopper-type regulator circuit for controlling a pulse width of a current mode.
Figure 11:
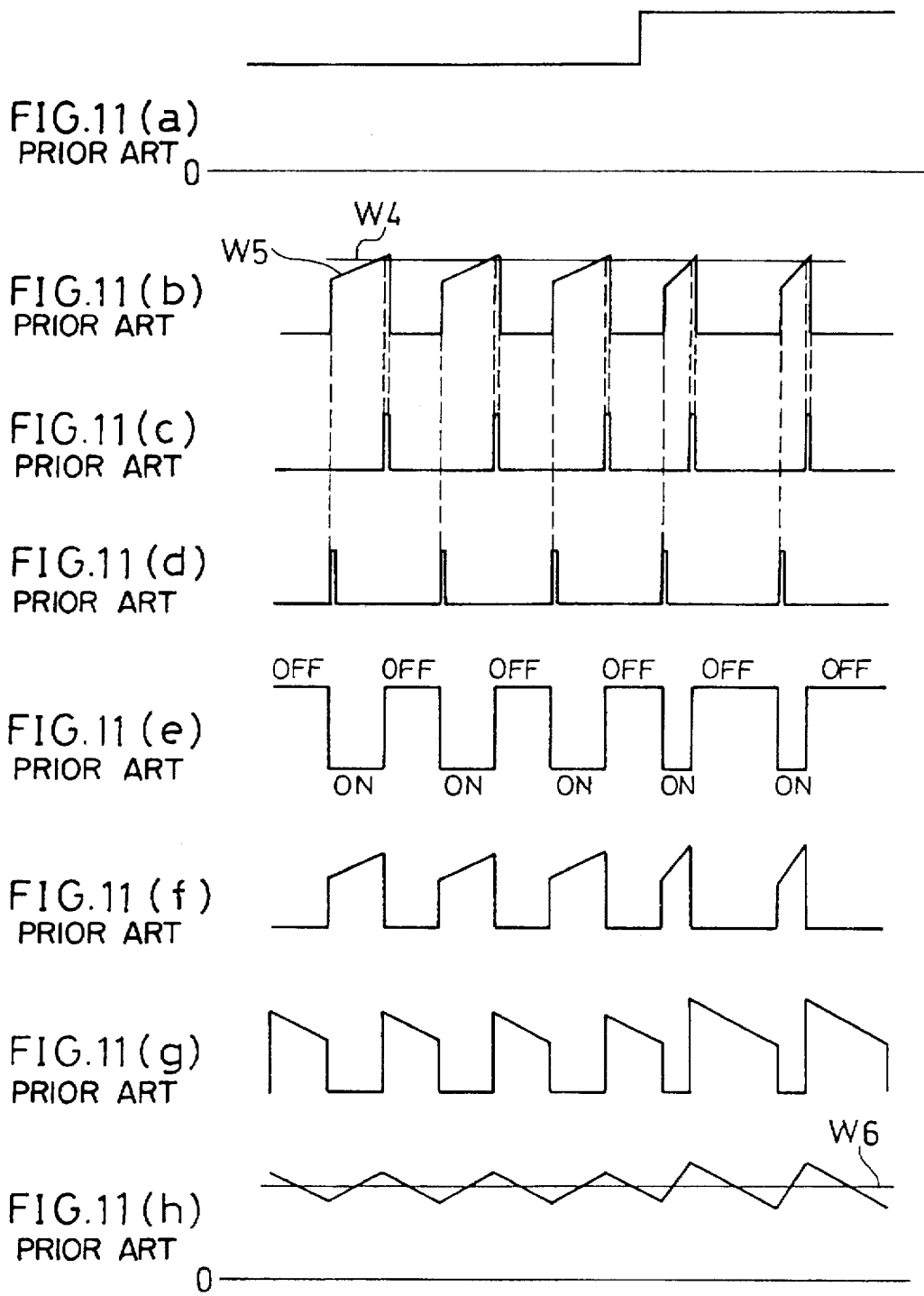
FIGS. 11(a) through 11(h) are waveform diagrams of main signals of the chopper-type regulator circuit shown in FIG. 10.

The following describes embodiment 1 of the present invention with reference to FIG. 2 and FIG. 7.

Figure 1:
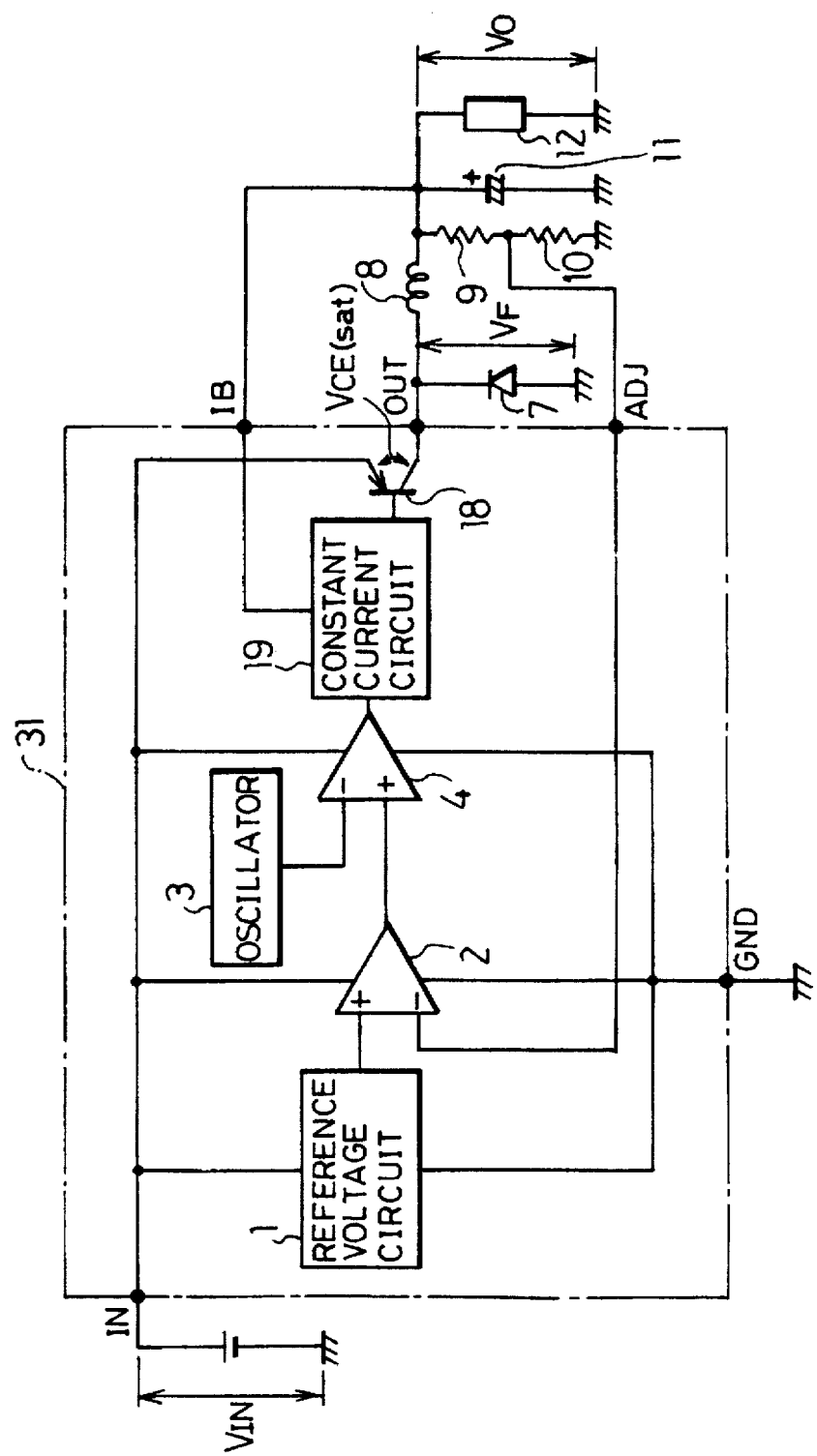
FIG. 1 is a block diagram which shows an electrical configuration of a chopper-type regulator circuit for controlling a pulse width of a voltage mode of embodiment 1 of the present invention.
Figure 12:
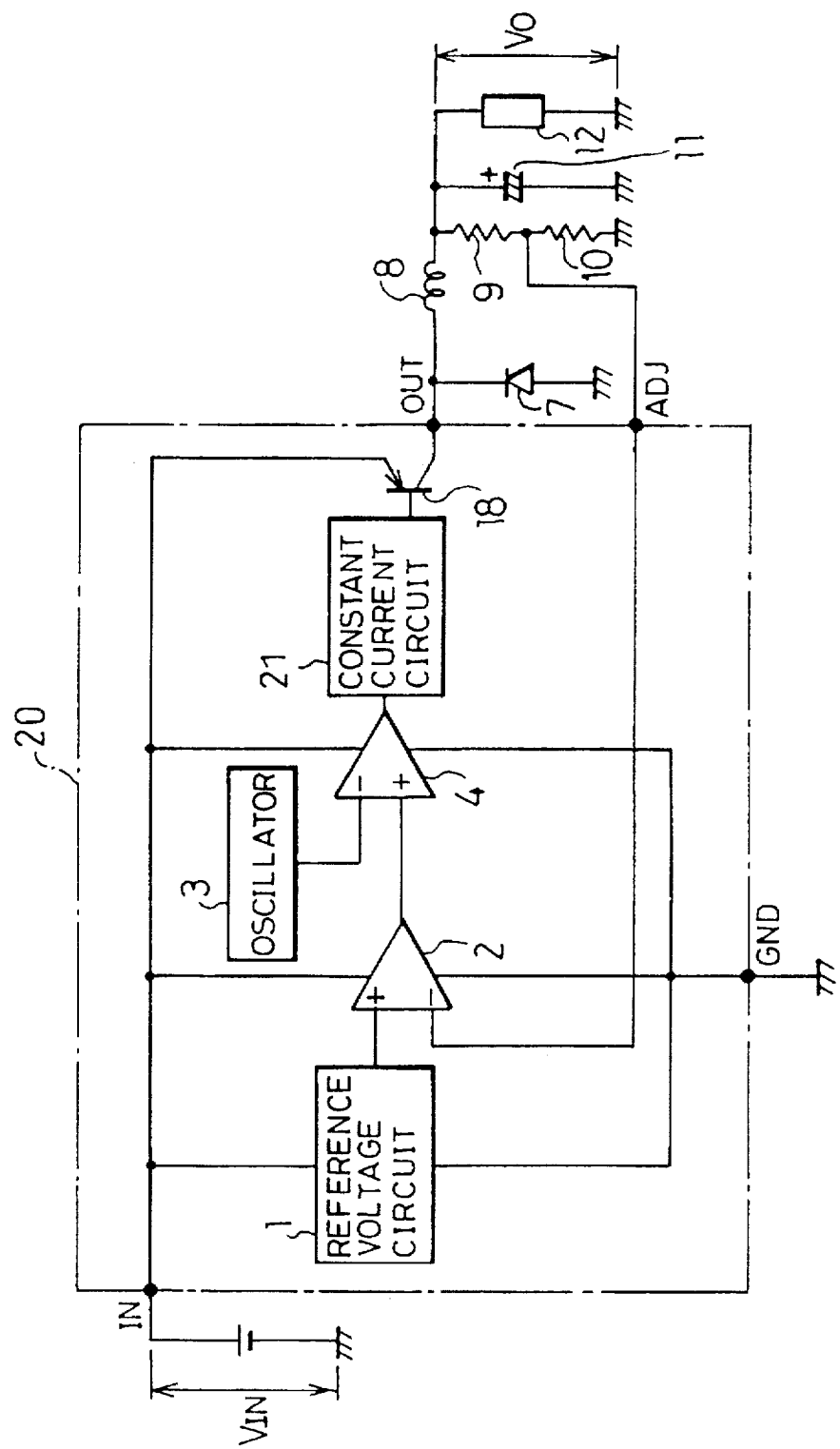
FIG. 12 is a block diagram which shows an electrical configuration of another conventional chopper-type regulator circuit for controlling a pulse width of a voltage mode.

FIG. 1 is a block diagram which shows an electrical configuration of a chopper-type regulator circuit for controlling a pulse width of a voltage mode (i.e. a regulator circuit). The same reference numerals of FIG. 12 are given to blocks of FIG. 1 which have the same configuration as the blocks shown in FIG. 12.

A regulator circuit 31 is composed of a reference voltage circuit 1, an error amplifier 2 (voltage difference output means), an oscillator 3, a PWM (Pulse Width Modulation) comparator 4 (comparing means), an output transistor 18 which is a PNP-type transistor and a constant current circuit 19 (constant current means). The regulator circuit 31 controls a pulse width of a voltage mode so as to stabilize an output voltage.

In addition, a catch diode 7, a coil 8, a voltage dividing circuit composed of two resistors 9 and 10 and an output capacitor 11 which are indispensable elements are externally mounted to the regulator circuit 31. But for them, an output voltage cannot be obtained (12 of FIG. 1 represents a load). Circuit components other than the output transistor 18 are control sections.

The reference voltage circuit 1 generates a reference voltage wherein a change in response to an input voltage $V_{IN}$ applied to an input terminal IN and a change with temperature are extremely small. In other words, the reference voltage is a stabilized prescribed voltage. The generated reference voltage is sent to an non-reverse input of the error amplifier 2.

The error amplifier 2 amplifies a voltage difference between a voltage (divided voltage) led to a feedback terminal ADJ connected to a reverse input and the reference voltage so as to output the voltage as an error signal. The error signal is sent to a non-reverse input of the PWM comparator 4.

The oscillator 3 composed of an integrating circuit, etc. for a constant current generates an a.c. wave. The generated a.c. wave is sent to a reverse input of the PWM comparator 4.

The PWM comparator 4 compares an a.c. wave generated by the oscillator 3 with an error signal.

In order to lower a voltage between a collector and an emitter which are in ON state so as to reduce a loss of the collector, a PNP-type transistor is used as the output transistor 18. A current led to the input terminal IN is switched, and the switched current is sent to an output terminal.

When the output transistor 18 is turned ON based upon an output of the PWM comparator 4, the constant current circuit 19 draws a base current of the output transistor 18 and controls such that the base current becomes constant whether an input voltage $V_{IN}$ is high or low. Moreover, the base current is led to a base current output terminal IB.

When the output transistor 18 is turned OFF, the catch diode 7 wherein a cathode is connected to the output terminal OUT and anode is grounded forms a closed circuit between the coil 8 and a load 12. A current generated by energy stored in the coil 8 flows to the catch diode 7.

The coil 8 stores and releases energy when the output transistor 18 is switched. Since the catch diode 7 and the output capacitor 11 are paired, the coil 8 converts a switched voltage into a d.c. voltage.

The voltage divided circuit composed of the two resistors 9 and 10 sets a voltage applied to the load 12. Moreover, the voltage divided circuit generates a divided voltage to be sent to the feedback terminal ADJ.

The base current output terminal IB is directly connected to the load 12, and the base current output terminal IB supplies the base current drawn by the constant current circuit 19 to the load 12.

In FIG. 1, the regulator circuit 31 is sealed in a package of a chopper-type regulator IC. The sealing arrangement is mentioned later.

The following describes an operation of the regulator circuit 31.

First, when an input voltage $V_{IN}$ is applied to the input terminal IN, the regulator circuit 31 is actuated. Then, an output voltage $V_O$ is divided by the voltage dividing circuit composed of the resistors 9 and 10 connected to the load 12, and the divided voltage is fed back to the feedback terminal ADJ. Since the feedback terminal ADJ is connected to the reverse input of the error amplifier 2, an error signal (differential voltage), which is obtained by amplifying a voltage difference between the divided voltage and a reference voltage outputted from the reference voltage circuit 1, is outputted from the error amplifier 2.

Meanwhile, in the PWM comparator 4, a voltage outputted from the oscillator 3 is compared with the error voltage outputted from the error amplifier 2. When the voltage from the oscillator 3 is higher than the error voltage, the PWM comparator 4 outputs a control signal with H level, and when the voltage from the oscillator 3 is lower than the error voltage, the PWM comparator 4 outputs a control signal with L level. The constant current circuit 19 draws a base current of the output transistor 18 based upon the control signal, and the output transistor 18 is actuated (switched). In other words, when the control signal is at H level, the output transistor 18 is turned OFF, and when the control signal is at L level, the output transistor 18 is turned ON.

When the output transistor 18 is in ON state (an output of the PWM comparator 4 is at L level), a current successively flows to the input terminal IN, the output transistor 18 and the coil 8, and the current is supplied to the load 12. Further, the base current of the output transistor 18 flows to the base current output terminal IB via the constant current circuit 19 so as to be supplied to the load 12.

When the output transistor 18 is in OFF state (an output of the PWM comparator 4 is at H level), a current, which is generated by energy stored in the coil 8 while the output transistor 18 is in ON state, is supplied to the load 12 via the catch diode 7.

The following concretely describes a configuration of the constant current circuit 19 of the present embodiment and its operation.

FIG. 2 is a drawing which explains a configuration of the constant current circuit 19 in FIG. 1. A constant current circuit 19 is composed of PNP-type transistors 61 and 62 (fourth and fifth transistors), NPN-type transistors 63, 64 and 65 (third, second and first transistors), a resistor 67 and a voltage source 66 (reference current generating means). The voltage source 66 is a voltage source created in a regulator (for example, band gap reference).

The NPN-type transistor 64 and the resistor 67 are connected in parallel to the voltage source 66. Moreover, a base of the NPN-type transistor 64 is connected to a base of the NPN-type transistor 63. Namely, since the NPN-type transistors 63 and 64 are arranged so as to have a current mirror structure, a current $I_1$, which is obtained by the ratio of areas of emitters in the NPN-type transistors 63 and 64, flows to the NPN-type transistor 63, and the same current $I_1$ flows also to the PNP-type transistor 61.

A collector of the NPN-type transistor 65 is connected between bases of the NPN-type transistors 63 and 64, and a base of the NPN-type transistor 65 is connected to an output of the PWM comparator 4. The emitters of NPN-type transistors 63, 64 and 65 are grounded.

In addition, the PNP-type transistor 61 is connected to between the base of the output transistor 18 and the collecter of the NPN-type transistor 63. A base of the PNP-type transistor 61 is connected to a base of the PNP-type transistor 62. Since the PNP-type transistors 61 and 62 are arranged so as to have a current mirror structure, a current (base current $I_B$), which is obtained by the ratio of areas of emitters in the PNP-type transistors 61 and 62, flows the PNP-type transistor 62.

When the area of the emitter in the PNP-type transistor 62 to the area of the emitter in the PNP-type transistor 61 is sufficiently enlarged, a loss of the constant current circuit 19 can be reduced. As to the ratio of the areas of the emitters, for example, PNP-type transistor 61: PNP-type transistor 62=1:50.

The resistor 67 and the voltage source 66 are necessary for generating a reference current I which keeps the base current $I_B$ of the output transistor 18 constant. The reference current I is represented as follows:

$$I = (V_O - V_{BE})/R$$

wherein:

$V_0$=a voltage of the voltage source 66;

$V_{BE}$=a voltage between the base and emitter in the NPN-type transistor 64; and R=resistance of the resistor 67.

Therefore, according to a current mirror of the NPN-type transistors 63 and 64, the current $I_1$ is represented as follows:

$I_1$=(area of emitter in Transistor 63/area of emitter in Transistor 64)×I.

Moreover, according to a current mirror of the PNP-type transistors 61 and 62, the base current IB of the output transistor 18 is represented as follows:

$I_B$=(area of emitter in Transistor 62/area of emitter in Transistor 61)×$I_1$.

Therefore, the base current $I_B$ becomes steady current.

The following describes an operation of a circuit having the above configuration. An NPN-type transistor 65 is turned ON/OFF based upon a control signal outputted from the PWM comparator 4, and the output transistor 18 is turned ON/OFF. Usually, when the NPN-type transistor 65 is turned OFF, the output transistor 18 is turned ON. In other words, when an output of the PWM comparator 4 is at L level, the NPN-type transistor 65 is turned OFF, and the NPN-type transistor 64 is energized. Therefore, when the output transistor 18 is turned ON, the base current $I_B$ of the output transistor 18 flows to the base current output terminal IB through the PNP-type transistor 62 and reaches the load 12.

In such a manner, the constant current circuit 19 is capable of driving a base current $I_B$ of the output transistor 18 at constant current whether an input voltage $V_{IN}$ is high or low. Moreover, an excessive loss of the base current $I_B$ can be prevented.

For example, when an input voltage $V_{IN}$ is 24 V, an output voltage $V_O$ is 12 V and a base current $I_B$ of the output transistor 18 is 50 mA, a loss $M_1$ of the regulator circuit 31 is represented as follows:

$$
\begin{aligned}
M_1 &= \text{loss of output transistor} + \text{loss of control} \quad \text{Equ. (1)} \\
&\quad \text{section} + \text{loss of base current} \\
&= V_{CE(sat)} \times I_C \times D + V_{IN} \times I_Q + (V_{IN} - V_0) \times I_B \times D \\
&= V_{CE(sat)} \times I_C \times D + V_{IN} \times I_Q + (24 - 12) \times 0.05 \times 0.52 \\
&= V_{CE(sat)} \times I_C \times D + V_{IN} \times I_Q + 0.312,
\end{aligned}
$$

wherein:

$D=(V_0+V_F)/(V_{IN}-V_{CE(sat)}+V_F)$, $V_F$: forward voltage of catch diode 7≅0.5 V $V_{CE(sat)}$: voltage drop between collector and emitter in output transistor 18≅0.5 V Ic: collector current of output transistor 18

$I_Q$: current consumption.

In addition, for comparison, a loss $M_2$ of a conventional regulator circuit 20 shown in FIG. 12 is represented as follows:

$$
\begin{aligned}
M_2 &= \text{loss of output transistor} + \text{loss of control} \\
&\quad \text{section} + \text{loss of base current} \\
&= V_{CE(sat)} \times I_C \times D + V_{IN} \times I_Q + V_{IN} \times I_B \times D \\
&= V_{CE(sat)} \times I_C \times D + V_{IN} \times I_Q + 24 \times 0.05 \times 0.52 \\
&= V_{CE(sat)} \times I_C \times D + V_{IN} \times I_Q + 0.624.
\end{aligned}
$$

Therefore, when the regulator circuit 31 of the present embodiment is compared with the conventional regulator circuit 20 in FIG. 12, losses of their output transistors 18 and losses of the control sections are same, but losses of base currents $I_B$ of the output transistors 18 can be reduced 0.312 (W) (=0.624 (W)−0.312 (W)). Moreover, since a PNP-type transistor is used as the output transistor 18 in the regulator circuit 31, a voltage drop between the collector and the emitter can be reduced.

Therefore, since the regulator circuit 31 of the present embodiment can reduce the loss of the regulator circuit 31, efficiency of a circuit is improved as shown by a solid line A of FIG. 7. FIG. 7 shows efficiency of the conventional regulator circuit 31 (solid line A) and of the regulator circuit 20 (broken line B) when an input voltage $V_{IN}$ is 24 V, an output voltage $V_O$ is 12 V, a base current $I_B$ of the output transistor 18 is 50 mA and current consumption $I_Q$ is 20 mA.

EMBODIMENT 2

Figure 3:
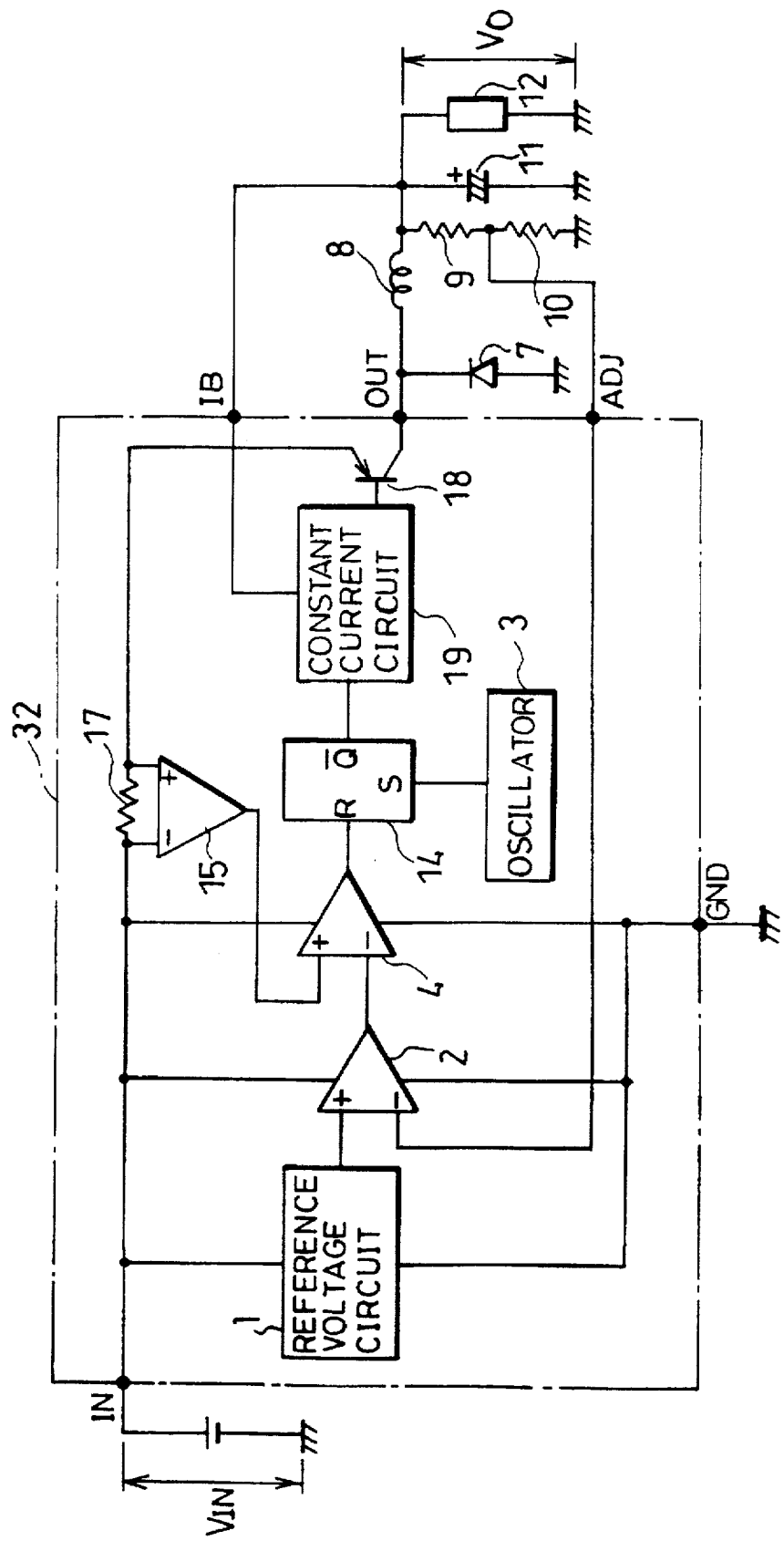
FIG. 3 is a block diagram which shows an electrical configuration of a chopper-type regulator circuit for controlling a pulse width of a current mode of embodiment 2 of the present invention.
Figure 4:
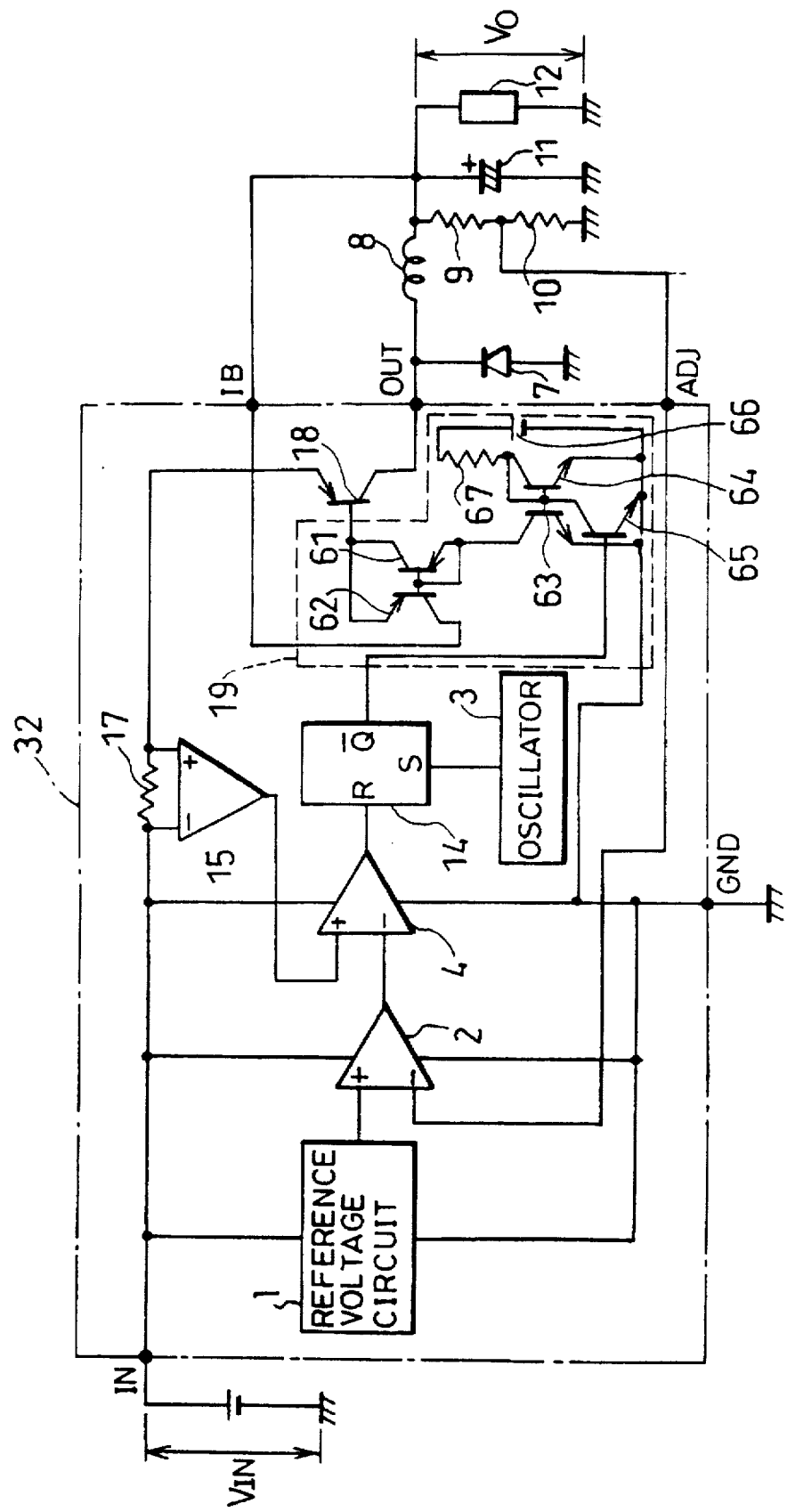
FIG. 4 is a circuit diagram which shows a concrete configuration of a constant current circuit shown in FIG. 3.

The following will describe embodiment 2 of the present invention with reference to FIG. 3 and FIG. 4. Here, for convenience of explanation, those members that have the same arrangement and functions, and that are described in the aforementioned embodiment 1 are indicated by the same reference numerals and the description thereof is omitted.

FIG. 3 is a block diagram which shows an electrical configuration of a chopper-type regulator circuit for controlling a pulse width of a current mode. A regulator circuit 32 is composed of a reference voltage circuit 1, an error amplifier 2, an oscillator 3, a PWM comparator 4, a PNP-type output transistor 18, a flip flop 14, a current detection amplifier 15, a current detecting resistor 17 and a constant current circuit 19. Moreover, external components having the same arrangements as in FIG. 1 are connected to the regulator circuit 32. Circuit parts other than the output transistor 18 constitute a control section.

The following describes an operation of the regulator circuit 32.

First, when an input voltage $V_{IN}$ is applied to an input terminal IN, the regulator circuit 32 is actuated. Then, an output voltage $V_O$ is divided by a voltage dividing circuit composed of resistors 9 and 10 connected to a load 12, and the divided voltage is fed back to a feedback terminal ADJ. Since the feedback terminal ADJ is connected to a reverse input of the error amplifier 2, a voltage difference between the divided voltage and a reference voltage outputted from the reference voltage circuit 1 is amplified so that an error signal (differential voltage) is outputted from the error amplifier 2.

Meanwhile, in the PWM comparator 4, a current which flows to the output transistor 18 is detected as a voltage by the current detecting resistor 17, a voltage, which is amplified by the current detection amplifier 15, is compared with the differential voltage outputted from the error amplifier 2. Then, a set signal (first set signal) is outputted from the PWM comparator 4.

When the voltage of the current detection amplifier 15 becomes higher than the differential voltage outputted from the error amplifier 2, an output of the PWM comparator 4 is at H level, and the flip flop 14 is reset. Then, the output transistor 18 is turned OFF, and the output transistor 18 is kept in OFF state until a set signal (second set signal) is inputted from the oscillator 3 to the flip flop 14. When the set signal is inputted to the flip flop 14, the constant current circuit 19 draws the base current of the output transistor 18 so that the output transistor 18 is actuated.

In other words, when the output transistor 18 is in ON state, current successively flows to the input terminal IN, the output transistor 18 and the coil 8 and is supplied to the load 12. Furthermore, base current of the output transistor 18 flows to the base current output terminal IB through the constant current circuit 19 so as to be supplied to the load 12. Meanwhile, when the output transistor 18 is in OFF state, a current, which is generated by energy stored in the coil 8 while the output transistor 18 is in ON state, is supplied to the load 12 through the catch diode 7.

Next, FIG. 4 shows a connecting state of a constant current circuit 19 in the present embodiment that is same as the circuit described in aforementioned embodiment 1. Only different points from embodiment 1 in operation of the constant current circuit 19 are described.

The constant current circuit 19 turns ON/OFF an NPN-type transistor 65 based upon an output signal of the flip flop 14 and then turns ON/OFF the output transistor 18. In other words, when an output of the flip flop 14 becomes L level, the NPN-type transistor 65 is turned OFF, and the output transistor 18 is turned ON. Moreover, when an output of the flip flop 14 becomes H level, the NPN-type transistor 65 is turned ON, and the output transistor 18 is turned OFF.

In the same manner as of the regulator circuit 31 of embodiment 1 for controlling a pulse width of a voltage mode, in the regulator circuit 32 for controlling a pulse width of a current mode, since a base current of the output transistor 18 is supplied to the load 12 through the base current output terminal IB, a loss of a base current can be reduced for a value of the product of output voltage ($V_O$), base current ($I_B$) of output transistor 18 and duty (D), which is represented by the equation (1). In addition, a loss of output transistor 18 can be reduced by decreasing a voltage drop between a collector and an emitter using a PNP-type output transistor 18. As a result, efficiency of the regulator circuit 32 can be improved.

A chopper-type regulator circuit of the present invention for stabilizing an output voltage includes a PNP-type output transistor and a control section for control switching of the output transistor based upon a voltage difference between a reference voltage and an output voltage. A base current output terminal, which is connected to a base of an output transistor and which outputs a base current flowing into the output transistor, is provided to the control section.

With respect to the above arrangement, since the base current output terminal for outputting a base current flowing into the output transistor is connected to the base of the output transistor, it is possible to take out a base current, which flows into the output transistor, to the outside. When the base current output terminal and a load connected to the chopper-type regulator circuit are connected, the base current of the output transistor can be directly supplied to the load. This makes it possible to reduce a loss of a driving section, thereby improving efficiency.

In addition, the chopper-type regulator circuit can be arranged so as to include a constant current circuit between the base of the output transistor and the base current output terminal.

As a result, when the output transistor is turned ON, the constant current circuit draws a base current of the output transistor so that the base current can be kept constant whether an input voltage is high or low. Consequently, an excessive loss of a base current of the output transistor can be prevented.

EMBODIMENT 3

Figure 6:
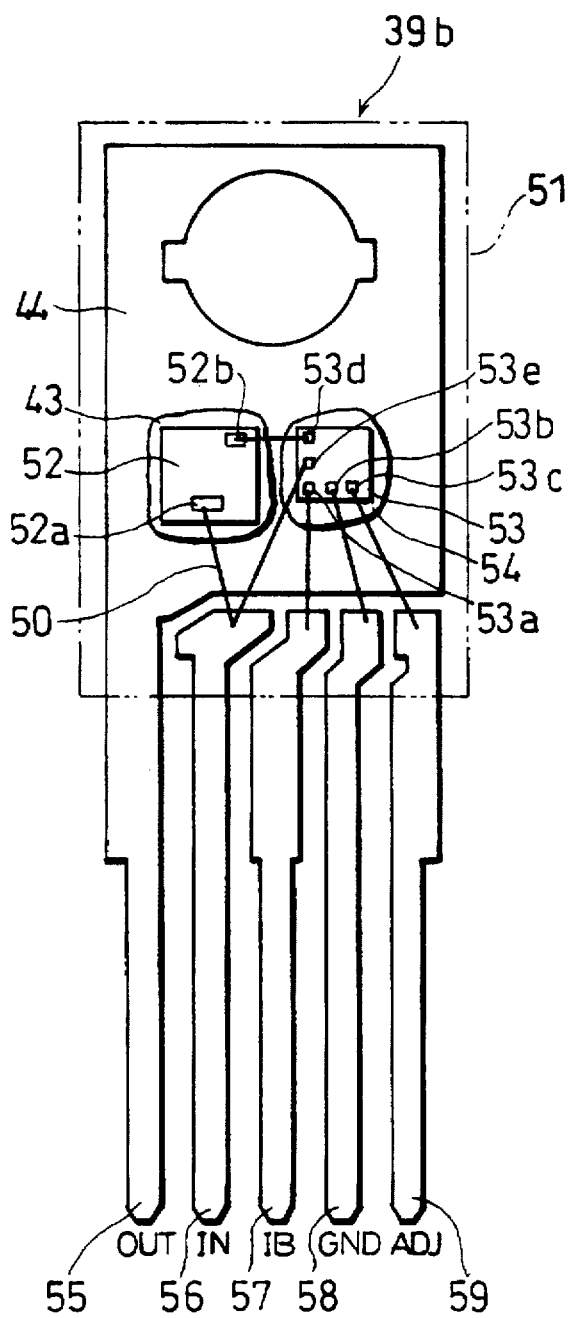
FIG. 6(a) is a plan view which shows an arrangement of another chopper-type regulator IC.
FIG. 6(b) is a side view of the above-mentioned chopper-type regulator IC.
Figure 6:
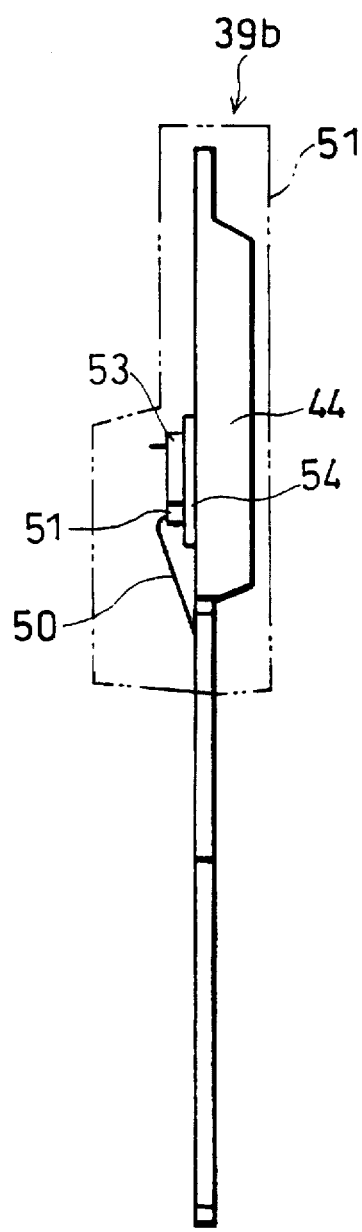

The following describes embodiment 3 of the present invention with reference to FIG. 5 and FIG. 6. Here, for convenience of explanation, those members that have the same arrangement and functions, and that are described in the aforementioned embodiments are indicated by the same reference numerals and the description thereof is omitted.

A chopper-type regulator circuit having a circuit configuration described in aforementioned embodiments 1 and 2 is integrated as a chopper-type regulator IC by an inner configuration mentioned below, for example.

As shown in FIGS. 5(a) and 5(b), a chopper-type regulator IC 39a includes a semiconductor chip 40 obtained by integrating a transistor section 41 and a control section 42 into one chip. The transistor section 41 is composed of an output transistor 18, and the control section 42 is obtained by integrating the above-mentioned components and circuits other than the output transistor 18.

The semiconductor chip 40 is stuck to a metal frame 44 by die-bonding a joining section 43 composed of solder.

One end of the metal frame 44 is extended so that an outer lead frame 45 is formed, and this section is a ground terminal GND. Moreover, an outer lead frame 46 which is an input terminal IN, an outer lead frame 47 which is an output terminal OUT, an outer lead frame 48 which is a base current output terminal IB and an outer lead frame 49 which is a feedback terminal ADJ are provided on the right side of the outer lead frame 45 viewed looking at FIG. 5(a) so as to be parallel with the outer lead frame 45.

In the transistor section 41, a contact section 41a which is an emitter is connected to the outer lead frame 46, and a contact section 41b which is a collector is connected to the outer lead frame 47.

In the control section 42, a contact section 42a for a base is connected to the outer lead frame 48, a contact section 42c for grounding is connected to the metal frame 44 and a contact section 42b for feedback is connected to the outer lead frame 49.

The above connections are wire-bonded by metal wire 50. Moreover, the transistor section 41, the control section 42, the metal frame 44 and also one ends of the outer lead frames 45 through 49 are coated with a package 51. The package 51 is composed of packing resin, such as epoxy resin, and it is formed by a transfer molding method or the like.

In the chopper-type regulator IC 39a, the regulator circuits 31 and 32 can be incorporated as one package, thereby realizing miniaturization. Moreover, the transistor section 41, which is composed of the output transistor 18, and the control section 42 are integrated as the semiconductor chip 40, thereby making it possible to reduce a number of components and to lower cost.

The following describes another arrangement example of the chopper-type regulator IC 39a.

As shown in FIGS. 6(a) and 6(b), a chopper-type regulator IC 39b has two chips; a transistor chip 52 and an IC chip 53. The transistor chip 52 is composed of an output transistor 18 as one chip, and the IC chip 53 is obtained by integrating the above elements and circuits other than the output transistor 18 into one chip.

The transistor chip 52 is stuck to a metal frame 44 by die-bonding a joining section 43 composed of solder. The IC chip 53 is stuck to the metal frame 44 by die-bonding insulating paste 54.

One end of the metal frame 44 is extended so that an outer lead frame 55 is formed thereon, and this section is an output terminal OUT. Moreover, an outer lead frame 56 which is an input terminal IN, an outer lead frame 57 which is a base current output terminal IB, an outer lead frame 58 which is a ground terminal GND and an outer lead frame 59 which is a feedback terminal ADJ are provided to the right side of the outer lead frame 55 viewed looking at FIG. 6(a) so as to be parallel with the outer lead frame 55.

As to the transistor chip 52, a contact section 52a which is an emitter is connected to the outer lead frame 56, a contact section 52b which is a base is connected to a contact section 53d for a control circuit of the IC chip 53, and a collector electrode is stuck to the outer lead frame 55 by solder 43 so as to be connected thereto.

As to the IC chip 53, a contact section 53e for input is connected to the outer lead frame 56, a contact section 53b for grounding is connected to the outer lead frame 58, a contact section 53a for a base current is connected to the outer lead frame 57, and a contact section 53c for feedback is connected to the outer lead frame 59.

The above connections are wire-bonded by a metal wire 50. Moreover, the chips 52 and 53, the metal frame 44 and one ends of the outer lead frames 55 through 59 are coated with a package 51. The package 51 is composed of packing resin, such as epoxy resin, and it is formed by the transfer molding method or the like.

In the same manner as of the chopper-type regulator IC 39a, in the chopper-type regulator IC 39b, the regulator circuits 31 and 32 can be incorporated into one package, thereby realizing miniaturization.

The chopper-type regulator IC of the present invention is characterized by including (1) a semiconductor chip obtained by integrating the output transistor and the control section into one chip or a semiconductor chip composed of each chip of the output transistor and of the control section, (2) a metal frame composed of the semiconductor chip and the base current output terminal and (3) packing resin for sealing the semiconductor chip.

As a result, a chopper-type regulator circuit can be arranged as one package, thereby realizing miniaturization.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chopper-type regulator circuit for stabilizing an output voltage, comprising:

an output transistor composed of a PNP-type transistor for switching an input current; and a control section for controlling the switching of said output transistor based upon a voltage difference between a reference voltage and an output voltage, wherein said control section includes a base current output terminal for supplying base current of said output transistor to a load connected to said chopper-type regulator circuit, and further wherein said control section controls a pulse width of a voltage mode and includes:

a voltage difference output means for outputting the voltage difference between the reference voltage and the output voltage, a comparison means for comparing the output signal from said voltage difference output means with a prescribed pulse signal so as to output a control signal, and a constant current means for drawing the base current so as to keep a value of the base current constant when said output transistor is in conducting state based upon the control signal, said constant current means being connected between a base of said output transistor and said base current output terminal, said constant current circuit including:

a first transistor for switching said output transistor based upon the control signal;

a reference current generating means for generating a reference current;

a second transistor where said reference current flows when said output transistor is connected by said switching operation via said first transistor;

a third transistor where a first current, which has a prescribed relationship to the reference current, flows, said third transistor being in current mirror arrangement to said second transistor;

a fourth transistor where the first current flows, said fourth transistor connected between the base of said output transistor and said third transistor; and a fifth transistor where the base current, which has a prescribed relationship to the first current, flows, said fifth transistor being in current mirror arrangement to said fourth transistor.

2. The chopper-type regulator circuit as defined in claim 1, wherein said fourth transistor has a larger area for an emitter than of said fifth transistor.

3. The chopper-type regulator circuit as defined in claim 1, wherein said first through third transistors are NPN-type transistors, and said fourth and fifth transistors are PNP-type transistors.

4. A chopper-type regulator circuit for stabilizing an output voltage, comprising:

an output transistor composed of a PNP-type transistor for switching an input current; and a control section for controlling the switching of said output transistor based upon a voltage difference between a reference voltage and an output voltage, wherein said control section includes a base current output terminal for supplying a base current of said output transistor to a load connected to said chopper-type regulator circuit, and further wherein said control section controls a pulse width of a current mode and includes:

a voltage difference output means for outputting the voltage difference between the reference voltage and the output voltage, a comparison means for comparing an output from said voltage difference output means with a current flow in said output transistor so as to output a first set signal, a flip flop for switching said output transistor based upon the first set signal and a prescribed second set signal, and a constant current means for drawing the base current so as to keep a value of the base current constant when said output transistor is brought to a conducting state by said switching operation via said flip flop, said constant current means being connected between a base of said output transistor and said base current output terminal, wherein said constant current circuit includes:

a first transistor for switching said output transistor based upon the control signal;

a reference current generating means for generating a reference current;

a second transistor where the reference current flows when said output transistor is conducted by said switching operation via said first transistor, a third transistor where a first current, which has a prescribed relationship to the reference current, flows, said third transistor being in current mirror arrangement to said second transistor;

a fourth transistor where the first current flows, said fourth transistor connected between a base of said output transistor and said third transistor; and a fifth transistor where a base current, which has a prescribed relationship to the first current, flows, said fifth transistor being in current mirror arrangement to said fourth transistor.

5. The chopper-type regulator circuit as defined in claim 4, wherein said fourth transistor has a larger area for an emitter than of said fifth transistor.

6. The chopper-type regulator circuit as defined in claim 4, wherein said first through third transistors are NPN-type transistors and said fourth and fifth transistors are PNP-type transistors.

7. A chopper-type regulator IC obtained by integrating a chopper-type regulator circuit, said chopper-type regulator circuit including:

an output transistor, composed of a PNP-type transistor, for switching an input current; and a control section for controlling switching of said output transistor based upon a voltage difference between a reference voltage and an output voltage, said control section provided with a base current output terminal for supplying a base current of said output transistor to a load connected to said chopper-type regulator circuit, said control section controlling a pulse width of a voltage mode and including:

a voltage difference output means for outputting the voltage difference between the reference voltage and the output voltage, a comparison means for comparing the output signal from said voltage difference output means with a prescribed pulse signal so as to output a control signal, and a constant current means for drawing the base current so as to keep a value of the base current constant when said output transistor is in conducting state based upon the control signal, said constant current means being connected between a base of said output transistor and said base current output terminal, said constant current circuit including:

a first transistor for switching said output transistor based upon the control signal;

a reference current generating means for generating a reference current;

a second transistor where said reference current flows when said output transistor is connected by said switching operation via said first transistor;

a third transistor where a first current, which has a prescribed relationship to the reference current, flows, said third transistor being in current mirror arrangement to said second transistor;

a fourth transistor where the first current flows, said fourth transistor connected between the base of said output transistor and said third transistor; and a fifth transistor where the base current, which has a prescribed relationship to the first current, flows, said fifth transistor being in current mirror arrangement to said fourth transistor, and said chopper-type regulator IC, comprising:

a semiconductor chip obtained as one chip by integrating said output transistor and said control section;

a metal frame, which is mounted with said semiconductor chip, having said base current output terminal; and a packing resin for sealing said semiconductor chip.

8. A chopper-type regulator IC obtained by integrating a chopper-type regulator circuit, said chopper-type regulator circuit including:

an output transistor, which is composed of a PNP-type transistor, for switching an input current; and a control section for controlling switching of said output transistor based upon a voltage difference between a reference voltage and an output voltage, said control section provided with a base current output terminal for supplying a base current of said output transistor to a load connected to said chopper-type regulator circuit, said control section controlling a pulse width of a voltage mode and including:

a voltage difference output means for outputting the voltage difference between the reference voltage and the output voltage, a comparison means for comparing the output signal from said voltage difference output means with a prescribed pulse signal so as to output a control signal, and a constant current means for drawing the base current so as to keep a value of the base current constant when said output transistor is in conducting state based upon the control signal, said constant current means being connected between a base of said output transistor and said base current output terminal, said constant current circuit including:

a first transistor for switching said output transistor based upon the control signal;

a reference current generating means for generating a reference current;

a second transistor where said reference current flows when said output transistor is connected by said switching operation via said first transistor;

a third transistor where a first current, which has a prescribed relationship to the reference current, flows, said third transistor being in current mirror arrangement to said second transistor;

a fourth transistor where the first current flows, said fourth transistor connected between the base of said output transistor and said third transistor; and a fifth transistor where the base current, which has a prescribed relationship to the first current, flows, said fifth transistor being in current mirror arrangement to said fourth transistor, and said chopper-type regulator IC, comprising:

a semiconductor chip obtained by integrating said output transistor and said control section respectively as one chip;

a metal frame, which is mounted with said semiconductor chip, having said base output terminal; and a packing resin for sealing said semiconductor chip.

9. A chopper-type regulator IC obtained by integrating a chopper-type regulator circuit, said chopper-type regulator circuit including:

an output transistor, which is composed of a PNP-type transistor, for switching an input current; and a control section for controlling switching of said output transistor based upon a voltage difference between a reference voltage and an output voltage, said control section provided with a base current output terminal for supplying a base current of said output transistor to a load connected to said chopper-type regulator circuit, said control section controlling a pulse width of a voltage mode and including:
- a voltage difference output means for outputting the voltage difference between the reference voltage and the output voltage,
- a comparison means for comparing the output signal from said difference output means with a current flow in said output transistor so as to output a first set signal,
- a flip flop for switching said output transistor based upon the first set signal and a prescribed second set signal, and
- a constant current means for drawing the base current so as to keep a value of the base current constant when said output transistor is brought to a conducting state by said switching operation via said flip flop, said constant current means being connected between a base of said output transistor and said base current output terminal, wherein said constant current circuit includes:
- a first transistor for switching said output transistor based upon the control signal;
- a reference current generating means for generating a reference current;
- a second transistor where the reference current flows when said output transistor is conducted by said switching operation via said first transistor,
- a third transistor where a first current, which has a prescribed relationship to the reference current, flows, said third transistor being in current mirror arrangement to said second transistor;
- a fourth transistor where the first current flows, said fourth transistor connected between a base of said output transistor and said third transistor; and
- a fifth transistor where a base current, which has a prescribed relationship to the first current, flows, said fifth transistor being in current mirror arrangement to said fourth transistor, and said chopper-type regulator IC, comprising:
- a semiconductor chip obtained as one chip by integrating said output transistor and said control section;
- a metal frame, which is mounted with said semiconductor chip, having said base current output terminal; and
- a packing resin for sealing said semiconductor chip.

10. A chopper-type regulator IC obtained by integrating a chopper-type regulator circuit, said chopper-type regulator circuit including:

an output transistor, composed of a PNP-type transistor, for switching an input current; and a control section for controlling switching of said output transistor based upon a voltage difference between a reference voltage and an output voltage, said control section provided with a base current output terminal for supplying a base current of said output transistor to a load connected to said chopper-type regulator circuit, said control section controlling a pulse width of a current mode and including:
- a voltage difference output means for outputting the voltage difference between the reference voltage and the output voltage,
- a comparison means for comparing an output from said voltage difference output means with a current flow in said output transistor so as to output a first set signal,
- a flip flop for switching said output transistor based upon the first set signal and a prescribed second set signal, and
- a constant current means for drawing the base current so as to keep a value of the vase current constant when said output transistor is brought to a conducting state by said switching operation via said flip flop, said constant current means being connected between a base of said output transistor and said base current output terminal, wherein said constant current circuit includes:
- a first transistor for switching said output transistor based upon the control signal;
- a reference current generating means for generating a reference current;
- a second transistor where the reference current flows when said output transistor is conducted by said switching operation via said first transistor,
- a third transistor where a first current, which has a prescribed relationship to the reference current, flows, said third transistor being in current mirror arrangement to said second transistor;
- a fourth transistor where the first current flows, said fourth transistor connected between a base of said output transistor and said third transistor; and
- a fifth transistor where a base current, which has a prescribed relationship to the first current, flows, said fifth transistor being in current mirror arrangement to said fourth transistor, and said chopper-type regulator IC, comprising:
- a semiconductor chip obtained by integrating said output transistor and said control section respectively as one chip;
- a metal frame, which is mounted with said semiconductor chip, having said base current output terminal; and
- a packing resin for sealing said semiconductor chip.

* * * * *